US010451930B2

(12) United States Patent
Ling et al.

(10) Patent No.: US 10,451,930 B2
(45) Date of Patent: Oct. 22, 2019

(54) LIQUID CRYSTAL DISPLAY PANEL AND DISPLAY DEVICE

(71) Applicant: Xiamen Tianma Micro-Electronics Co., Ltd., Xiamen (CN)

(72) Inventors: Ankai Ling, Xiamen (CN); Yanping Yu, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 18 days.

(21) Appl. No.: 15/796,661

(22) Filed: Oct. 27, 2017

(65) Prior Publication Data

US 2018/0348580 A1    Dec. 6, 2018

(30) Foreign Application Priority Data

Jun. 1, 2017 (CN) .......................... 2017 1 0403709

(51) Int. Cl.
*G02F 1/1343* (2006.01)
*G02F 1/1337* (2006.01)
*G02F 1/1333* (2006.01)

(52) U.S. Cl.
CPC .. *G02F 1/134309* (2013.01); *G02F 1/133707* (2013.01); *G02F 2001/133391* (2013.01); (Continued)

(58) Field of Classification Search
CPC ............. G02F 1/1343; G02F 1/134309; G02F 2201/123; G02F 2001/134345; G02F 1/133707
See application file for complete search history.

(56) References Cited

U.S. PATENT DOCUMENTS

2005/0099573 A1* 5/2005 Kubo ................ G02F 1/134309
349/146
2014/0211143 A1* 7/2014 Yuan ................. G02F 1/133707
349/143
(Continued)

FOREIGN PATENT DOCUMENTS

CN      103926753 A    7/2014
CN      103941490 A    7/2014
(Continued)

OTHER PUBLICATIONS

Chinese Office Action dated May 30, 2019 for corresponding Chinese Patent Application No. 201710403709X.

*Primary Examiner* — Jia X Pan
(74) *Attorney, Agent, or Firm* — Tarolli, Sundheim, Covell & Tummino LLP (57) ABSTRACT

The present disclosure relates to a liquid crystal display panel and a display device. The liquid crystal display panel includes a display area; and a non-display area surrounding the display area, wherein the display area includes a plurality of sub-areas, each of the plurality of sub-areas is provided with a plurality of pixel electrodes, all of the pixel electrodes in a sub-area have an identical brightness control parameter; and the brightness control parameter of the pixel electrodes in at least one sub-area is different from the brightness control parameter of the pixel electrodes in another sub-area. By setting different brightness control parameters based on different temperature rise in the sub-areas, the problem of poor Gamma uniformity of the display panel can be solved, and the possibility of occurrence of ghost can be reduced, thereby increasing display quality of the liquid crystal display panel.

13 Claims, 6 Drawing Sheets

(52) U.S. Cl.
CPC ............ *G02F 2001/134345* (2013.01); *G02F 2201/123* (2013.01)

(56) References Cited

U.S. PATENT DOCUMENTS

| | | | |
|---|---|---|---|
| 2015/0108552 A1* | 4/2015 | Yamazaki | H01L 29/42384 257/288 |
| 2015/0109268 A1* | 4/2015 | Huang | G09G 3/36 345/206 |
| 2016/0187741 A1* | 6/2016 | Liu | G02F 1/134309 349/43 |
| 2018/0211630 A1* | 7/2018 | Kato | G09G 3/3696 |

FOREIGN PATENT DOCUMENTS

| | | |
|---|---|---|
| CN | 104267547 A | 1/2015 |
| CN | 104570514 A | 4/2015 |

* cited by examiner

LIQUID CRYSTAL DISPLAY PANEL AND DISPLAY DEVICE

CROSS-REFERENCE TO RELATED APPLICATIONS

The present application claims the benefit of priority to Chinese Patent Application No. 201710403709.X, filed on Jun. 1, 2017, the content of which is incorporated herein by reference in its entirety.

TECHNICAL FIELD

The present disclosure relates to the field of display technologies and, in particular, to a liquid crystal display panel and a display device.

BACKGROUND

At present, there is increasing need on products with more pixels per inch (Pixels Per Inch, PPI) and products having integrated an array substrate with touch control function. However, power consumption of an integrated circuit (Integrated Circuit, IC) which supports the above two types of products is much higher than power consumption of an IC for a normal product. It is well known that, high power consumption leads to temperature rise of the IC.

In another aspect, since the product with more PPI has poor transmittance, backlight with high brightness is needed. A general solution is to increase current of a light-emitting diode (Light-Emitting Diode, LED) or increase the number of the LED. Of course, the above manner also leads to increase of power consumption of the LED, causing excessively high temperature of the LED.

Since the temperature of both the IC and the LED is excessively high, temperature of the display area close to an IC end will rise, and the temperature difference in a panel will increase due to poor heat dissipation effect of the panel.

Since temperature influences parameters such as viscosity, elastic coefficient and dielectric constant of the liquid crystal, excessive temperature difference in the panel will lead to Gamma uniformity at different positions.

SUMMARY

The present disclosure provides a liquid crystal display panel and a display device, which can reduce the phenomenon of Gamma uniformity of the liquid crystal display panel, and improve display quality of the liquid crystal display panel.

A first aspect of the present disclosure provides a liquid crystal display panel. The liquid crystal display panel includes a display area and a non-display area surrounding the display area. The display area includes a plurality of sub-areas, each of the plurality of sub-areas is provided with a plurality of pixel electrodes, and all of the pixel electrodes in a sub-area have an identical brightness control parameter. The brightness control parameter of the pixel electrodes in at least one sub-area is different from the brightness control parameter of the pixel electrodes in another sub-area.

A second aspect of the present disclosure further provides a display device, the display device includes a liquid crystal display panel. The liquid crystal display panel includes: a display area and a non-display area surrounding the display area. The display area includes a plurality of sub-areas, each of the plurality of sub-areas is provided with a plurality of pixel electrodes, and all of the pixel electrodes in a sub-area have an identical brightness control parameter. The brightness control parameter of the pixel electrodes in at least one sub-area is different from the brightness control parameter of the pixel electrodes in another sub-area.

The technical solutions provided by the present disclosure can achieve the following beneficial effects:

In the present disclosure, the brightness control parameters can influence an electric field direction or magnitude of an electric field force, and the electric field direction or the magnitude of the electric field force will influence a deflection angle of the liquid crystal. In a certain range, the larger the deflection angle of the liquid crystal, the larger the brightness after light penetrating through the liquid crystal and emitting out of the liquid crystal display panel. Thus, it is known that, the Gamma uniformity of the liquid crystal display panel can be improved by setting different brightness control parameters based on different temperature rise in the sub-areas, so as to reduce the possibility of occurrence of ghost, thereby increasing display quality of the liquid crystal display panel.

It should be understood that, the above general description and the detailed description as follows are merely exemplary, which cannot limit the present disclosure.

REFERENCE SIGNS

1—liquid crystal display panel;
  11—display area;
    111—sub-area;
      1111—pixel electrode;
        1111a—body portion;
        1111b—additional portion;
        1111c—slit;
  12—non-display area;
2—heat source;

3—liquid crystal;
100—display device.

The drawings herein are incorporated into the present description and form a part thereof, which show embodiments of the present disclosure, and are used to explain the principle of the present disclosure together with the description.

DESCRIPTION OF EMBODIMENTS

The present disclosure will be described in further detail with reference to the following embodiments and the accompanying drawings.

It should be noted that, the directional expressions such as "up", "down", "left" and "right" used in the present disclosure are intended to describe from the view shown in the figures, which shall not be interpreted as limiting the embodiments of the present disclosure. In addition, in the context, it should be understood that, when an element is formed "above" or "below" another element, the element may be formed directly above or below the another element, or may be formed indirectly above or below the other element by means of an intermediate element.

Figure 1:
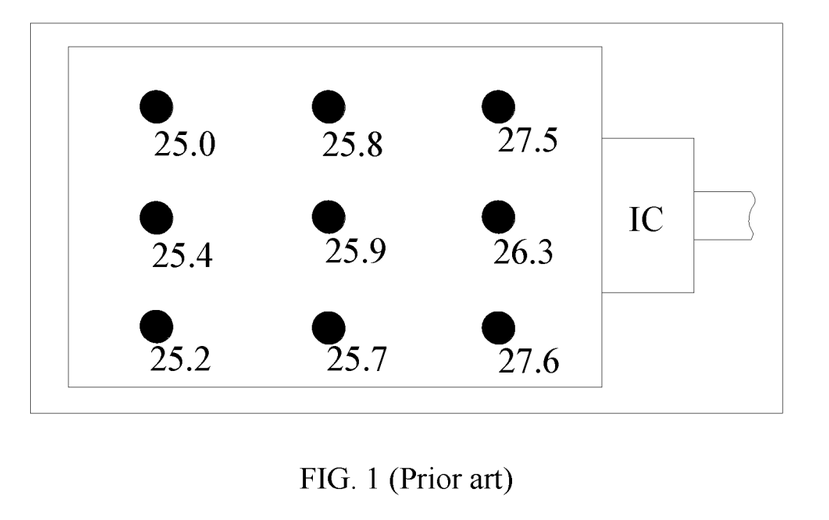
FIG. 1 illustrates a schematic view showing temperature rise at different test points of a display panel according to the prior art.

FIG. 1 illustrates a schematic view showing temperature rise at different test points of a display panel according to the prior art. As shown in FIG. 1, taking a 5.5 FHD touch embed display (Touch Embed Display, TED) product as an example, a maximum temperature difference among 9 test points is greater than 2.5° C.

Figure 2:
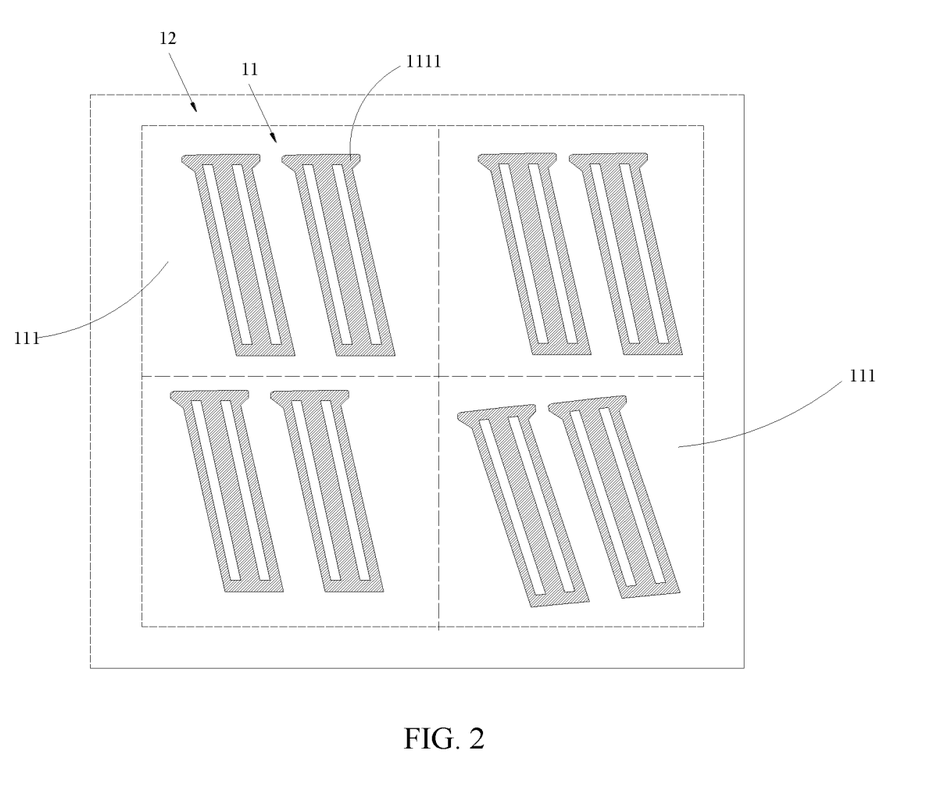
FIG. 2 illustrates a schematic view I of pixel electrodes in sub-areas according to an embodiment of the present disclosure.
Figure 3:
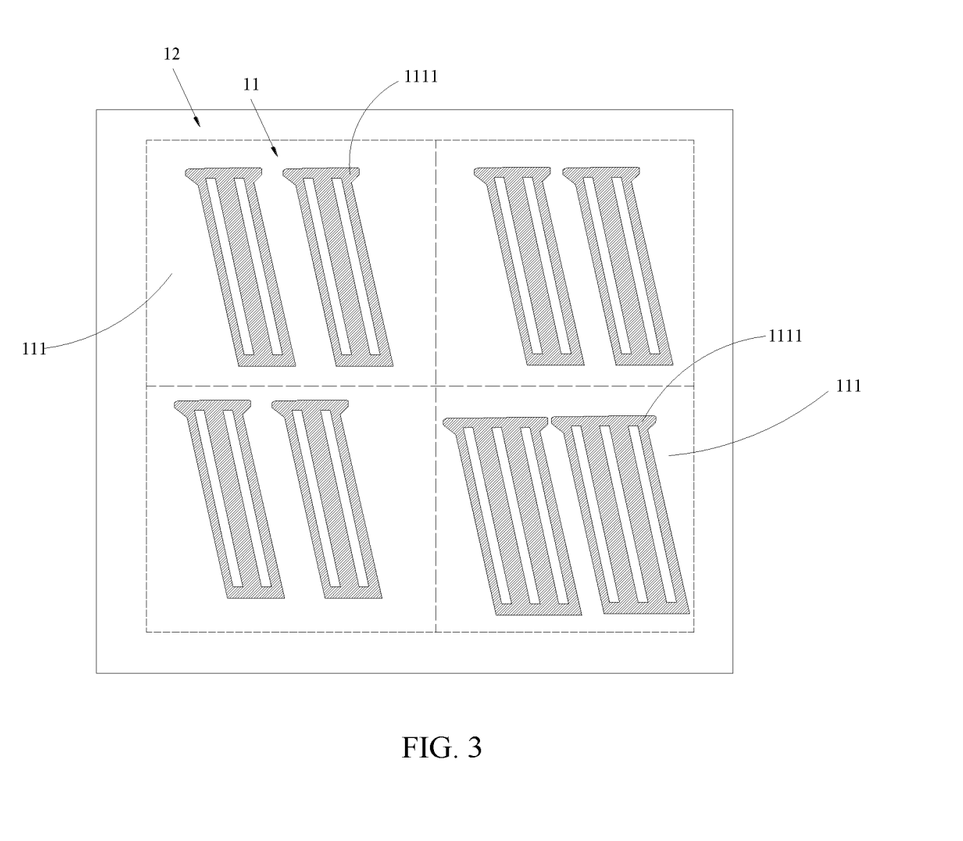
FIG. 3 illustrates a schematic view II of pixel electrodes in sub-areas according to an embodiment of the present disclosure.

FIG. 2 illustrates a schematic view I of pixel electrodes in sub-areas according to an embodiment of the present disclosure. As shown in FIGS. 2-3, there exist a maximum difference between a gamma value of 127 gray scale close to the IC end (the 6$^{th}$ point) and a gamma value away from the IC end (1st point and 7th point). At this time, a concentration of foreign ion in a liquid crystal box will increase as the temperature of the panel increases, accordingly, the closer to the IC end, the greater the possibility of occurrence of ghost on the panel. As shown in FIG. 3, an embodiment of the present disclosure provides a liquid crystal display panel 1, and the liquid crystal display panel 1 includes a display area 11 and a non-display area 12. Generally, the non-display area 12 surrounds the display area 11. The display area 11 is located at a central area of the display panel 1. The display area 11 is also called as the pixel area, the pixel area includes a plurality of pixel units arranged in a matrix.

The display area 11 includes a plurality of sub-areas 111, the number of the sub-areas 111 is n, and n is greater than or equal to 2, and each sub-area 111 includes a plurality of pixel electrodes 1111. In order to improve Gamma uniformity in the liquid crystal display panel, it is proposed in the present disclosure that, in a same sub-area 111, brightness control parameters of the pixel electrodes 1111 are the same; in different sub-areas 111, brightness control parameters of the pixel electrodes 1111 in at least one sub-area 111 are different from brightness control parameters of the pixel electrodes 1111 in another sub-area 111.

In the embodiment shown in FIGS. 2-3, brightness control parameters of the pixel electrodes 1111 in the right-bottom sub-area 111 is different from brightness control parameters of the pixel electrodes 1111 in the other three sub-areas 111.

The brightness control parameters can influence an electric field direction or magnitude of an electric field force, and the electric field direction or the magnitude of the electric field force will influence a deflection angle of the liquid crystal. In a certain range, the larger the deflection angle of the liquid crystal, the larger the brightness of the light after transmitting through the liquid crystal and then emitting out of the liquid crystal display panel 1. Thus, it is known that, the Gamma uniformity of the liquid crystal display panel 1 can be improved by setting different brightness control parameters based on different temperature rise in the sub-areas 111, so as to reduce the possibility of occurrence of ghost, thereby increasing display quality of the liquid crystal display panel 1.

Figure 4:
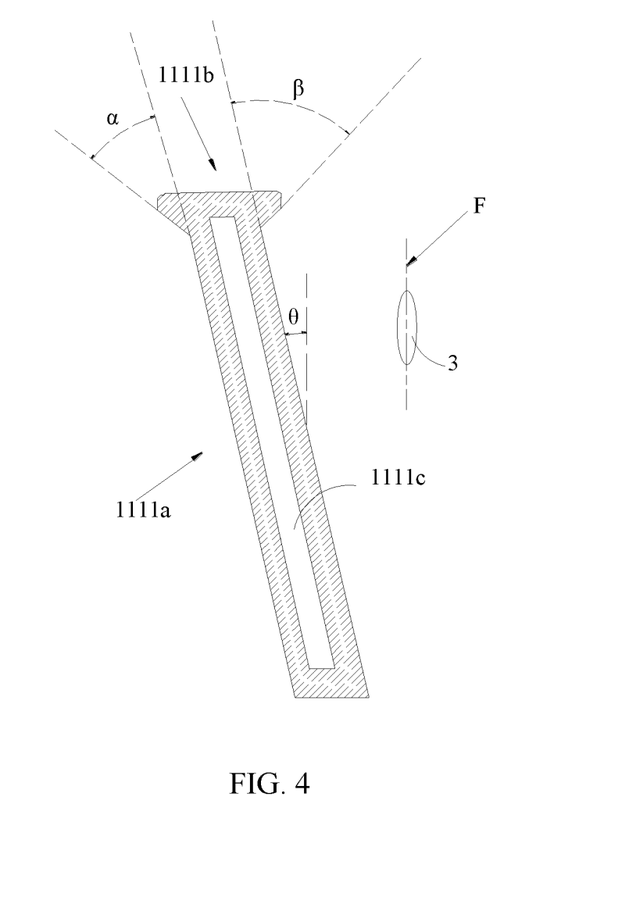
FIG. 4 illustrates a schematic view of a pixel electrode and a liquid crystal according to an embodiment of the present disclosure.

The brightness control parameters include an angle θ of the pixel electrode 1111, as shown in FIG. 4, the angle θ refers to an included angle between an extending direction of a body portion of the pixel electrode 1111 and a first direction. The first direction is a direction perpendicular to an extending direction of a gate line. If the liquid crystal is a positive liquid crystal, an original alignment direction (F direction in FIG. 4) is substantially perpendicular to the gate line. The pixel electrode 1111 includes a body portion 1111a extending along a straight line direction and an additional portion 1111b connected with the body portion 1111a. The angle θ is an included angle between the extending direction of the body portion 1111a and the first direction, and the first direction is a direction perpendicular to the extending direction of the gate line.

It should be noted that, the liquid crystal 3 has two types: positive liquid crystal and negative liquid crystal. An original alignment direction of the positive liquid crystal is a column direction of arrangement of the pixel units, an original alignment direction of the negative liquid crystal is perpendicular to the column direction. Preferably, an extending direction of a data line electrically connected with the pixel electrode 1111 is not parallel to the column direction. The embodiments of the present disclosure mainly take the positive liquid crystal as an example for illustration.

The brightness control parameters further include the number of the slits 1111c, as shown in FIG. 4, the slit 1111c is a slit provided in the pixel electrode 1111, the slit 1111c provide space for the electric field lines to pass through. It should be understood that, the more the slits 1111c, the more the electric field lines passing through the slits 1111c, and the greater the electric field force.

Based on the above description, the brightness control parameters include the angle θ of the pixel electrode 1111 and the number of the slits 1111c of the pixel electrode 1111. In an aspect, the angle θ of the pixel electrode 1111 determines an electric field direction of the display panel 1 (the electric field direction is always perpendicular to the body portion 1111a) after being powered on, and the electric field direction directly influences the angle θ of the liquid crystal 3. In a certain range, the larger the deflection angle of the liquid crystal 3, the greater the brightness of the light after passing through the liquid crystal and emitting out of the liquid crystal display panel 1. In another aspect, the number of the slits 1111c of the pixel electrode 1111 directly influences the number of the electric field lines passing through the slit 1111c after the liquid crystal display panel 1 is powered on, thus influences the magnitude of the electric field force, and the magnitude of the electric field force will also influence the angle θ of the liquid crystal 3. Therefore, by setting different angles θ of the pixel electrodes 1111 in different sub-areas 111, or by setting different numbers of slits 1111 of the pixel electrode 1111 in different sub-areas 111, the problem of poor Gamma uniformity of the liquid crystal display panel can be improved.

In an embodiment, angles θ of the pixel electrodes 1111 in the same sub-area 111 are the same, while in different sub-areas 111, an angle θ of the pixel electrodes 1111 in at least one sub-area 111 is set to be different from an angle θ of the pixel electrodes 1111 in another sub-area 111. In any two sub-areas 1111, an angle θ of the pixel electrodes 1111 in a sub-area with a relative high average temperature is greater than an angle θ of the pixel electrodes 1111 in a sub-area with a relative low average temperature. The average temperature can be obtained by detecting temperature at a plurality of detecting points in the sub-area 111, the more the selected detecting points, the more accurate the detected average temperature. Moreover, a reasonable selection of the positions of detecting points will also influence the result of the average temperature, those skilled in the art would be able to perform an accurate detection of the average temperature of the sub-areas 111 according to the above principles.

Figure 5:
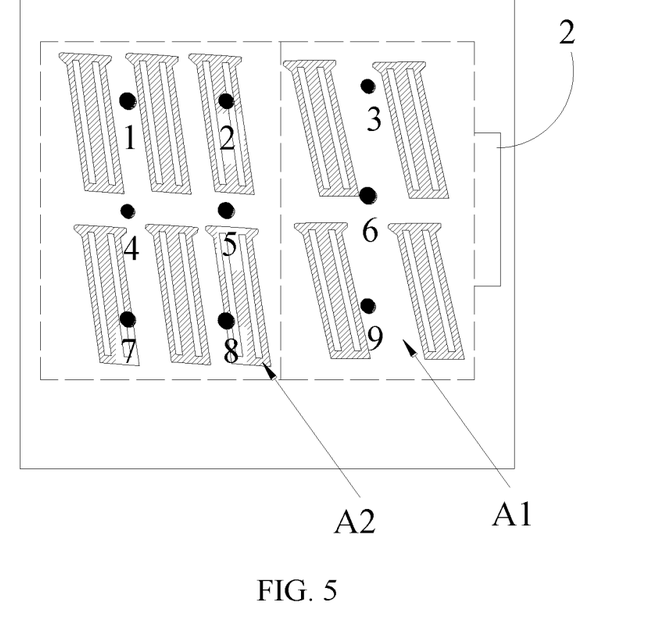
FIG. 5 illustrates a schematic view of a liquid crystal display panel being divided into two sub-areas according to an embodiment of the present disclosure.

As shown in FIG. 5, the display area 11 includes two sub-areas 111, respectively a first sub-area A1 and a second sub-area A2. The detecting points in the first sub-area A1 are respectively point 3, point 6 and point 9, and the detecting points in the second sub-area A2 are respectively point 1, point 4, point 7, point 2, point 5 and point 8.

In an embodiment, the angle θ of the pixel electrodes 1111 in the first sub-area A1 is set as 10°, and the angle θ of the pixel electrodes 1111 in the second sub-area A2 is set as 9.33°. Combining the above principle and based on the actual detected result, it can be known that, each increase of 0.67° of the angle θ of the pixel electrode 1111 in the second sub-area A2 corresponds to an increase of 0.03° of the brightness ratio G127/G255 (a ratio of gray scale 127 to gray scale 255) of the first sub-area A1 and the second sub-area A2. Thus, the Gamma uniformity in the two sub-areas is improved.

Of course, the number of the sub-areas 111 is not limited to 2 as shown in FIG. 5, and in other embodiments, the number of the sub-areas 111 can be three or more. It should be understood that, when the liquid crystal display panel 1 is divided into more sub-areas 111, the angle θ of the pixel electrodes 111 in each sub-area 111 can be set correspondingly, so as to better improve the Gamma uniformity of the liquid crystal display panel 1.

Figure 6:
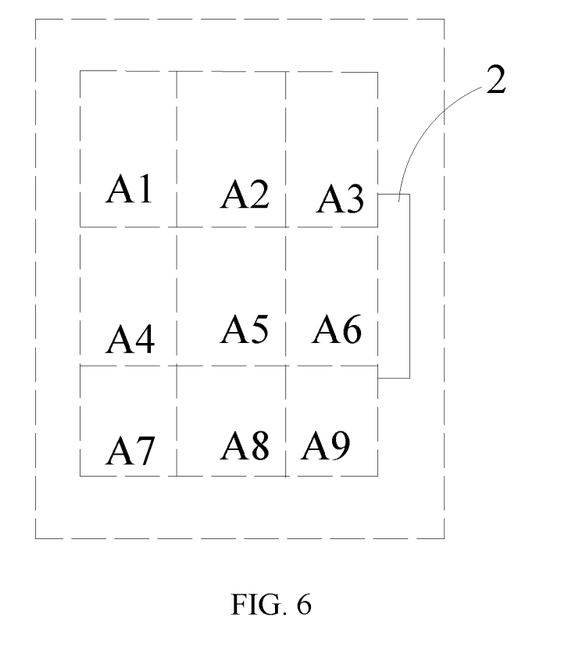
FIG. 6 illustrates a schematic view of a liquid crystal display panel being divided into nine sub-areas according to an embodiment of the present disclosure.

As shown in FIG. 6, optionally, the display area 11 includes nine sub-areas 111, which are a first sub-area A1, a second sub-area A2, a third sub-area A3, a fourth sub-area A4, a fifth sub-area A5, a sixth sub-area A6, a seventh sub-area A7, an eighth sub-area A8 and a ninth sub-area A9, respectively. The first sub-area A1, the second sub-area A2, the third sub-area A3, the fourth sub-area A4, the sixth sub-area A6, the seventh sub-area A7, the eighth sub-area A8 and the ninth sub-area A9 surround the fifth sub-area A5. At this time, the average temperature value of the fifth sub-area A5 can be used as a reference temperature value, and the Gamma uniformity of the liquid crystal display panel is improved by adjusting the angle θ of the pixel electrodes 1111 in the other eight sub-areas rather than the fifth sub-area A5.

Generally, the closer to the heat source 2 a sub-area of the liquid crystal display panel, the higher the average temperature of the sub-area, which means, the average temperature of a sub-area 111 is in direct proportion to the distance between the sub-area 111 and the heat source 2. For example, as shown in FIG. 5 and FIG. 6, the average temperature of each of the third sub-area A3, the sixth sub-area A6 and the ninth sub-area A9 is higher than the average temperature of any other sub-area. The heat source 2 can be any electric device that emits heat, and in the embodiment shown in FIGS. 5-6, the heat source 2 is an IC.

Figure 7:
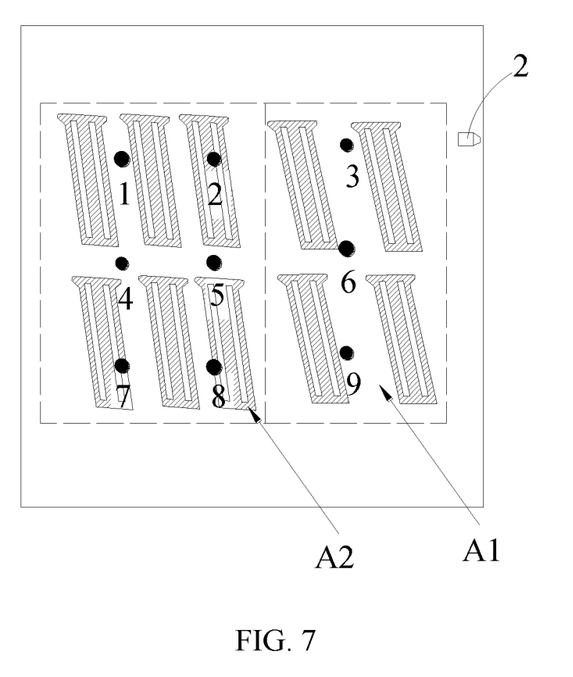
FIG. 7 illustrates a schematic view showing a situation with a heat source being a backlight source according to an embodiment of the present disclosure.

Please refer to FIG. 7, the heat source 2 can also be a backlight source, such as an LED light.

In the liquid crystal display technique, it is known that, the extending direction of the body portion 1111a of the pixel electrode 1111 is perpendicular to the direction of the electric field formed between the power-on common electrode and pixel electrode 1111. Therefore, the extending direction of the body portion 1111a of the pixel electrode 1111 is related to the rotating direction of the liquid crystal in the electric field. For a positive liquid crystal, the liquid crystal molecule tends to rotate to make its long axis parallel to the electric field direction; for a negative liquid crystal, the liquid crystal molecule tends to rotates to make its short axis parallel to the electric field direction.

In the present disclosure, for any two sub-areas 111, the range of the angle θ of the pixel electrodes 1111 in the sub-area with lower average temperature can be set as 1°-20°.

Moreover, according to actual detected result, for any two sub-areas 1111, the difference between the angle θ of the pixel electrodes 1111 in one sub-area with a higher average temperature and the angle θ of the pixel electrodes 1111 in the other sub-area with a lower average temperature can be set in a range of 3°-5°. In this range, it is verified through experiments that the gamma uniformity of the liquid crystal display panel can be improved.

In the present disclosure, the module transmission rate of the liquid crystal display panel 1 is tested, and the test results are shown in Table 1. Table 1 shows the module transmission rate of the liquid crystal display panel 1 when the angle θ of the pixel electrodes 1111 in a same sub-area is set as 6°, 10° and 14°, respectively.

TABLE 1

| Angle | 6° | 10° | 14° |
| --- | --- | --- | --- |
| G255 transmission rate | 3.99% | 4.04% | 4.08% |
| Increase proportion of white state transmission rate | REF | +1.25% | +2.26% |

From Table 1, it is known that when the angle θ of the pixel electrodes 1111 in one sub-area 111 is respectively 6°, 10° and 14°, the module transmission rate is respectively 3.99%, 4.04%, 4.08%, when the angle θ of the pixel electrodes 1111 in one sub-area 111 increases from 6° to 10°, the white state G255 transmission rate increases for 1.25%, and when the angle θ of the pixel electrodes 1111 in one sub-area 111 increases from 6° to 14°, the white state G255 transmission rate increases for 2.26%. According to experience values, the white state brightness is generally 450 nits, when the difference of the angle θ of the pixel electrodes 1111 in different sub-areas 111 is 1°, the brightness difference is only 1.4 nits. The reason lies in that, the angle θ of the pixel electrode 1111 determines an electric field direction of the liquid crystal display panel 1 (the electric field direction is always perpendicular to the body portion 1111a) after being powered on, and the electric field direction directly influences the deflection angle of the liquid crystal. In a certain range, the larger the deflection angle of the liquid crystal, the greater the brightness of the light after passing through the liquid crystal and emitting out of the liquid crystal display panel 1. Therefore, the brightness difference of the liquid crystal display panel 1 can be significantly reduced by appropriately reducing the difference of the angle θ. Moreover, if the white state brightness difference of the sub-areas is excessively great, it can be corrected by adjusting a corner angle α of the pixel electrode 1111.

The corner angle of the pixel electrode 1111 is an included angle between the additional portion 1111b and the body portion 1111a. Please refer to FIG. 4, in the shape formed by orthogonal projections of the additional portion 1111b and the body portion 1111a on the array substrate, the included angle at a joint position of the additional portion 1111b and the body portion 1111a is the corner angle α. In order to distinguish from the angle θ of the pixel electrodes 1111, the corner angle α can be recorded as a first included angle, and the white state brightness difference can be corrected by setting the first included angle as a non-zero included angle.

Further, in a same sub-area, the joint position of the additional portion 1111b and the body portion 1111a can be provided with a plurality of angles α. That is, for example, in the embodiment shown in FIG. 4, the number of the corner angle α can be two, i.e., a first included angle α and a first included angle β, and α is not identical to β.

Moreover, for different sub-areas, it can be set that at least one corner angle α in at least one sub-area is not identical to a corner angle α in another sub-area, so as to more accurately correct the white state brightness difference in different sub-areas.

It should be noted that, the manner of correcting white state brightness difference is not limited to the above described manner, and in other embodiments, the white state brightness difference can also be corrected by adjusting the brightness distribution of the backlight source.

As described above, the brightness control parameters further include the number of the slits 1111c of the pixel electrode 1111, that is, the gamma uniformity of the liquid crystal display panel can also be improved by setting the number of the slits 1111c of the pixel electrodes 1111 in different sub-areas 111 to be different.

Similarly, the display area 11 can be divided into a plurality of sub-areas 111, the number of the sub-area is n, and n is greater than or equal to 2, and each sub-area 111 is provided with a plurality of pixel electrodes 1111. In order to improve gamma uniformity of the liquid crystal display panel, the following arrangement can be adopted, that is, in any two sub-areas 111, the number of the slit 1111c of the pixel electrode 1111 in one sub-area with a higher average temperature is less than the number of the slit 1111c of the pixel electrode 1111 in the other sub-area with a lower average temperature.

Figure 8:
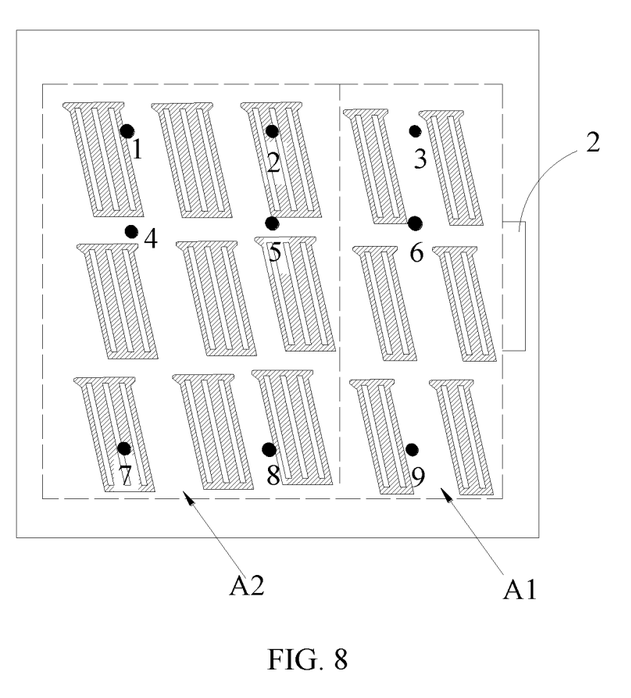
FIG. 8 illustrates a schematic view of pixel electrodes with different numbers of slits in two sub-areas according to an embodiment of the present disclosure.

According to an embodiment, as shown in FIG. 8, the display area 11 includes two sub-areas 111, respectively a first sub-area A1 and a second sub-area A2. Through sampling detecting points, the average temperature of the first sub-area A1 is greater than the average temperature of the second sub-area A2. At this time, it can be set that the number of the slits 1111c of the pixel electrode 1111 in the first sub-area A1 as two, and the number of the slits 1111c of the pixel electrode 1111 in the second sub-area A2 as three. It is verified by experiments that, when other conditions are kept unchanged, the brightness ratio G127/G255 increases, and the increased value is 0.035.

Based on the above embodiments, the module transmission rate of the liquid crystal display panel is further tested, and the test results are shown in Table 2. The mark accuracy (MA) of Table 2 is respectively 0.5 μm, 1 μm, 1.5 μm, 2 μm. The module transmission rate is presented when the numbers of slits 1111c of the pixel electrode 1111 in the two sub-areas are respectively two and three.

TABLE 2

| Number of slit | MA = 0.5 μm | MA = 1 μm | MA = 1.5 μm | MA = 2 μm |
|---|---|---|---|---|
| 2 | 4.93% | 4.82 | 4.57 | 4.36 |
| 3 | 5.02% | 4.93% | 4.67 | 4.44 |
| Decrease proportion of the module transmission rate of the first sub-area with respect to the module transmission rate of the second sub-area | 1.8% | 2.2% | 2.3% | 1.8% |

From Table 2, it is known that, under different contra-position accuracies, when the number of the slits 1111c of the pixel electrode 1111 in the first sub-area A1 is two, the module transmission rate is respectively 4.93%, 4.82%, 4.57%, 4.36%; when the number of the slits 1111c of the pixel electrode 1111 in the second sub-area A2 is three, module transmission rate is respectively 5.02%, 4.93%, 4.67%, 4.44%. Under different contra-position accuracies, comparing the module transmission rate of the first sub-area A1 having two slits 1111c with the module transmission rate of the second sub-area A2 having three slits 1111c, the decrease proportion of the module transmission rate of the first sub-area A1 with respect to the second sub area A2 is respectively 1.8%, 2.2%, 2.3%, 1.8%, the module transmission rate difference between the two sub-areas is approximately 2%, so that the gamma uniformity of the liquid crystal display panel is improved.

In order to form an electric field between the common electrode and the pixel electrode 1111, the number of the slit 1111c of the pixel electrode 1111 is at least one, and in the present embodiment, it can be set that, in any two sub-areas 111, the number of the slit 1111c of the pixel electrode 1111 in a sub-area with lower average temperature is 1-15.

Moreover, in any two sub-areas 111, a difference between the number of slit 1111c of the pixel electrode 1111 in one sub-area with a higher average temperature and the number of slit 1111c of the pixel electrode 1111 in a sub-area with a lower average temperature is in the other range of 1-5.

Of course, in other embodiments, the arrangement may be different from above, those of ordinary skill in the art can make reasonable selection according to the specific application scenario of the liquid crystal display panel.

In the embodiments shown in FIG. 5 and FIG. 8, the plurality of sub-areas 111 is strip-like areas and is arranged in parallel. The heat source 2 is arranged at a side of the first sub-area A1, and the side is in a width direction of the first sub-area A1 and away from the second sub-area A2. Such a division of the sub-areas is relatively simple and reasonable, which facilitates to improve the display quality of the liquid crystal display panel.

The present disclosure does not limit the specific structure of the pixel electrode 1111, for example, the pixel electrode 1111 in each sub-area 111 can be a pixel electrode 1111 with a single domain structure or a pixel electrode 1111 with a dual-domain structure, or can also be a pixel electrode 1111 with a pseudo dual-domain structure.

Figure 9:
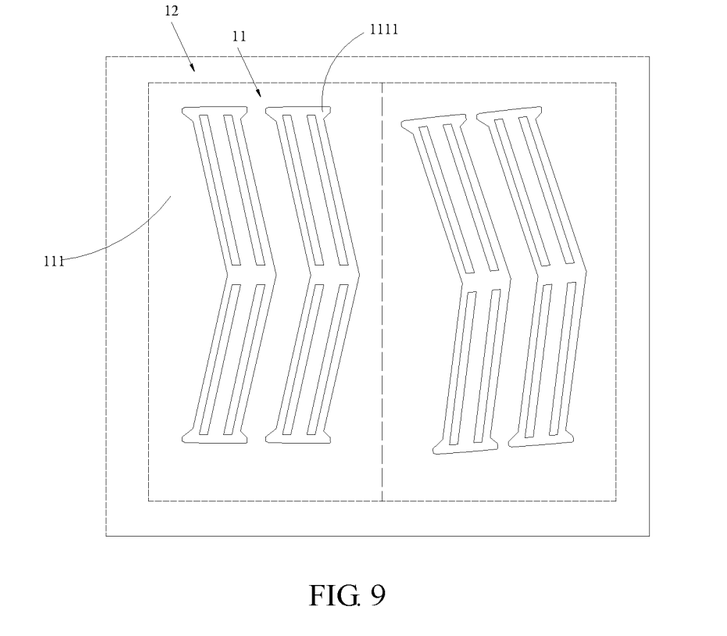
FIG. 9 illustrates a schematic view of a pixel electrode having a dual-domain structure according to an embodiment of the present disclosure.

Please refer to FIG. 9, when the pixel electrode 1111 in each sub-area 111 is a pixel electrode 1111 with a dual-domain structure, the dual-domain structure is divided into an upper domain and a lower domain. The angle θ of the pixel electrode 1111 in the upper domain of the sub-area 111 and the angle θ of the pixel electrode 1111 in the lower domain of the sub-area 111 have the same value but opposite directions.

In the liquid crystal display panel provided by the present disclosure, the liquid crystal molecule can be a positive liquid crystal or a negative liquid crystal.

Figure 10:
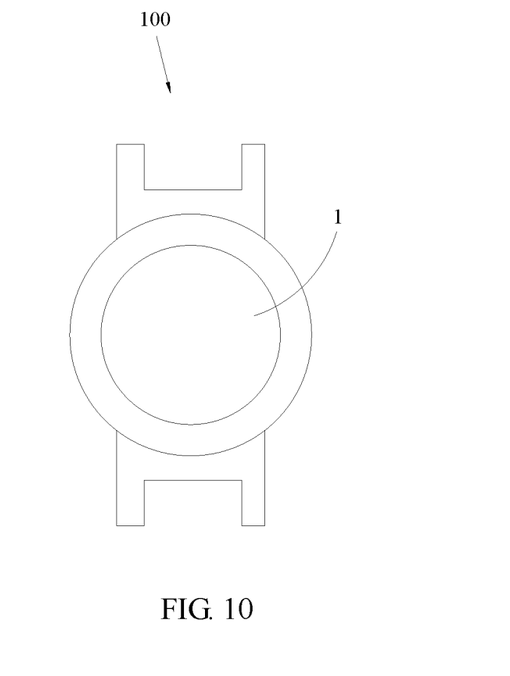
FIG. 10 illustrates a schematic view of a display device according to an embodiment of the present disclosure.

Please refer to FIG. 10, based on the above liquid crystal display panel 1, a second aspect of the present disclosure further provides a display device 100, and the display device includes a liquid crystal display panel 1 according to any one of the above embodiments.

The above are merely preferred embodiments of the present disclosure, which will not limit the present disclosure. For those of ordinary skill in the art, the present disclosure can have various modifications and variations. Any modification, equivalent replacement and improvement made based on the present disclosure shall fall into the protection scope of the present disclosure.

What is claimed is:

1. A liquid crystal display panel, comprising:
   a display area; and
   a non-display area surrounding the display area,
   wherein the display area comprises a plurality of sub-areas, each of the plurality of sub-areas is provided with a plurality of pixel electrodes,
   all of the pixel electrodes in a sub-area have an identical brightness control parameter; and the brightness control parameter of the pixel electrodes in at least one sub-area is different from the brightness control parameter of the pixel electrodes in another sub-area,
   the brightness control parameter comprises an angle of the pixel electrodes, each pixel electrode comprises a body portion extending along a straight line direction; the angle is an included angle between the extending direction of the body portion and a first direction and in a range of 1°-20° in a clockwise direction from the extending direction of the body portion to the first direction, and the first direction is a direction perpendicular to an extending direction of a gate line, and
   each pixel electrode further comprises an additional portion connected with the body portion; in a shape formed by orthogonal projections of the additional portion and the body portion on an array substrate, a joint position of the additional portion and the body portion presents a first included angle, and the first included angle is a non-zero included angle; a number of the first included angles is more than one, and at least two first included angles have different angle values.

2. The liquid crystal display panel according to claim 1, wherein in any two sub-areas, an angle of the pixel electrodes in one sub-area with a higher average temperature is greater than an angle of the pixel electrodes in the other sub-area with a lower average temperature.

3. The liquid crystal display panel according to claim 1, wherein in any two sub-areas, a range of the angle of the pixel electrodes in one sub-area with a lower average temperature is 1°-20°.

4. The liquid crystal display panel according to claim 1, wherein in any two sub-areas, a difference between an angle of the pixel electrodes in one sub-area with a higher average temperature and an angle of the pixel electrodes in the other sub-area with a lower average temperature is in a range of 3°-5°.

5. The liquid crystal display panel according to claim 1, wherein an angle value of at least one first included angle in at least one sub-area is not identical to an angle value of a first included angle in another sub-area.

6. The liquid crystal display panel according to claim 1, wherein the non-display area is provided with a heat source, an average temperature of each sub-area is directly proportional to a distance between each sub-area and the heat source.

7. The liquid crystal display panel according to claim 6, wherein the heat source comprises an integrated circuit.

8. The liquid crystal display panel according to claim 6, wherein the heat source comprises a backlight source.

9. The liquid crystal display panel according to claim 1, wherein each of the plurality of sub-areas is a strip-like area and is arranged parallel to others of the plurality of sub-areas.

10. The liquid crystal display panel according to claim 1, wherein each pixel electrode in each sub-area is a pixel electrode with a dual-domain structure, the dual-domain structure is divided into an upper domain and a lower domain; the angle of the pixel electrode in the upper domain and the angle of the pixel electrode in the lower domain have a same angle value but opposite directions.

11. The liquid crystal display panel according to claim 1, wherein each of the pixel electrodes in each sub-area is a pixel electrode with a single domain structure.

12. The liquid crystal display panel according to claim 1, further comprising a liquid crystal, wherein the liquid crystal is a positive liquid crystal or a negative liquid crystal.

13. A display device, comprising a liquid crystal display panel, wherein the liquid crystal display panel comprises:
   a display area; and
   a non-display area surrounding the display area,
   wherein the display area comprises a plurality of sub-areas, each of the plurality of sub-areas is provided with a plurality of pixel electrodes,
   all of the pixel electrodes in a sub-area have an identical brightness control parameter; and the brightness control parameter of the pixel electrodes in at least one sub-area is different from the brightness control parameter of the pixel electrodes in another sub-area,
   the brightness control parameter comprises an angle of the pixel electrodes, each pixel electrode comprises a body portion extending along a straight line direction; the angle is an included angle between the extending direction of the body portion and a first direction and in a range of 1°-20° in a clockwise direction from the extending direction of the body portion to the first direction, and the first direction is a direction perpendicular to an extending direction of a gate line, and
   each pixel electrode further comprises an additional portion connected with the body portion; in a shape formed by orthogonal projections of the additional portion and the body portion on an array substrate, a joint position of the additional portion and the body portion presents a first included angle, and the first included angle is a non-zero included angle; a number of the first included angles is more than one, and at least two first included angles have different angle values.

* * * * *